United States Patent
Mitadera et al.

(10) Patent No.: US 9,096,714 B2
(45) Date of Patent: Aug. 4, 2015

(54) THIN-WALL ARTICLE

(75) Inventors: Jun Mitadera, Kanagawa (JP); Takahiro Takano, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/824,027

(22) PCT Filed: Aug. 7, 2012

(86) PCT No.: PCT/JP2012/070065
§ 371 (c)(1),
(2), (4) Date: Mar. 15, 2013

(87) PCT Pub. No.: WO2013/038846
PCT Pub. Date: Mar. 21, 2013

(65) Prior Publication Data
US 2014/0194569 A1 Jul. 10, 2014

(30) Foreign Application Priority Data
Sep. 12, 2011 (JP) ................................ 2011-198121

(51) Int. Cl.
| | |
|---|---|
| C08G 69/26 | (2006.01) |
| C08K 7/02 | (2006.01) |
| C08L 77/06 | (2006.01) |
| B29C 45/00 | (2006.01) |
| B29C 45/74 | (2006.01) |
| C08J 5/00 | (2006.01) |

(52) U.S. Cl.
CPC ............ *C08G 69/26* (2013.01); *B29C 45/0001* (2013.01); *B29C 45/74* (2013.01); *C08G 69/265* (2013.01); *C08J 5/00* (2013.01); *C08K 7/02* (2013.01); *C08L 77/06* (2013.01)

(58) Field of Classification Search
CPC ...... C08G 69/26; C08G 69/265; C08G 69/28; C08L 77/06; B29K 2077/00; B32B 27/34
USPC .......................................... 524/607; 528/335
See application file for complete search history.

(56) References Cited

U.S. PATENT DOCUMENTS

| | | | |
|---|---|---|---|
| 6,319,575 B1 | 11/2001 | Takashima et al. | |
| 2011/0224370 A1* | 9/2011 | Kanda et al. .................. | 524/606 |
| 2012/0065327 A1 | 3/2012 | Ogawa et al. | |
| 2012/0076964 A1 | 3/2012 | Mitadera et al. | |
| 2013/0062806 A1 | 3/2013 | Mitadera | |
| 2013/0065004 A1 | 3/2013 | Yamamoto et al. | |
| 2013/0066041 A1 | 3/2013 | Mitadera et al. | |
| 2013/0078402 A1 | 3/2013 | Mitadera et al. | |
| 2013/0123439 A1 | 5/2013 | Mitadera et al. | |
| 2013/0172460 A1 | 7/2013 | Mitadera et al. | |

FOREIGN PATENT DOCUMENTS

| | | |
|---|---|---|
| CA | 2 764 882 A1 | 12/2010 |
| CN | 101198653 A | 6/2008 |
| CN | 102159620 A | 8/2011 |
| CN | 102449068 A | 5/2012 |
| CN | 103154087 A | 6/2013 |
| EP | 1 046 674 A2 | 10/2000 |
| EP | 2 327 737 A1 | 6/2011 |
| EP | 2 436 717 A1 | 4/2012 |
| EP | 2 570 459 A1 | 3/2013 |
| EP | 2 573 140 A1 | 3/2013 |
| EP | 2 586 813 A1 | 5/2013 |
| EP | 2 615 139 A1 | 7/2013 |
| EP | 2 626 377 A1 | 8/2013 |
| JP | 54-32458 | 10/1979 |
| JP | 63-137956 | 6/1988 |
| JP | 09-143281 | 6/1997 |
| JP | 2008-308512 | 12/2008 |
| JP | 2010-070638 | 4/2010 |
| TW | 201020274 A1 | 6/2010 |
| WO | 2010/032719 | 3/2010 |
| WO | WO 2010032719 A1 * | 3/2010 |
| WO | 2010/137703 | 12/2010 |
| WO | 2011/065346 | 6/2011 |
| WO | WO 2012/046629 A1 | 4/2012 |

OTHER PUBLICATIONS

Combined Office Action and Search Report issued Oct. 24, 2013 in Taiwanese Application No. 101131826 (With English Translation).
Combined Office Action and Search Report issued Nov. 5, 2013 in Chinese Application No. 201280003299.5 (With English Translation).
International Search Report and Written Opinion issued Nov. 6, 2012 in PCT/JP12/070065.
Extended European Search Report issued Apr. 4, 2014 in Patent Application No. 12823188.3.
"Thermal Properties and Flow Dynamics", MGC:Mitsubishi Gas Chemical Company, Inc pp. 1-3, XP002722134, Retrieved from the Internet: URL:http://www.mgc.co.jp/eng/products/nop/nmxd6/flow.html [retrieved on Mar. 24, 2014].
U.S. Appl. No. 13/822,152, filed Mar. 11, 2013, Mitadera, et al.

* cited by examiner

*Primary Examiner* — Michael Pepitone
(74) *Attorney, Agent, or Firm* — Oblon, McClelland, Maier & Neustadt, L.L.P.

(57) ABSTRACT

Provided is a thin-wall article formed from a polyamide resin which can be stably produced with little variation in mechanical properties such as flexural strength, flexural modulus and impact resistance. A thin-wall article formed by molding a polyamide resin (C) obtained by polycondensing a diamine (A) and a dicarboxylic acid (B) or a polyamide resin composition containing the polyamide resin, wherein 70 mol % or more of a diamine structural unit is derived from xylylenediamine and the polyamide resin has a melt viscosity (i) of 50 to 200 Pa·s as measured at a temperature of the melting point plus 10° C. for a holding time of 6 minutes at a shear rate of 122 $sec^{-1}$.

18 Claims, No Drawings

THIN-WALL ARTICLE

TECHNICAL FIELD

The present invention relates to thin-wall articles, specifically thin-wall articles that are formed by molding a polyamide resin or a polyamide resin composition containing the polyamide resin and that can be stably produced with little variation in mechanical properties such as flexural strength and impact resistance.

BACKGROUND ART

Polyamide resins are widely used as engineering plastics having excellent mechanical strength such as impact resistance and friction/abrasion resistance as well as excellent heat resistance and oil resistance in the fields of automotive parts, electronic/electric equipment parts, office automation equipment parts, machine parts, construction materials/housing parts and the like.

Many classes of polyamide resins including e.g., polyamide 6 and polyamide 66 are known, among which m-xylylene adipamide (hereinafter sometimes referred to as "MXD6") derived from m-xylylenediamine and adipic acid is positioned as a very excellent polyamide resin because it contains an aromatic ring in the main chain unlike polyamide 6, polyamide 66 and the like so that it has high rigidity, low water absorption and excellent oil resistance as well as a low molding shrinkage ratio and causes little sink marks or warpage, which means that it is also suitable for precision molding. For these reasons, MXD6 has recently been more widely used as a molding material, especially as an injection molding material in various fields including electronic/electric equipment parts, parts of vehicles such as automobiles, general machine parts, precision machine parts, leisure/sports goods, civil engineering and construction materials, etc.

With growing market demand for sophisticated and diverse products, lighter and stronger polyamide resin materials have also been needed and a known xylylenediamine polyamide resin lighter than MXD6 includes a xylylene sebacamide polyamide resin derived from xylylenediamine and sebacic acid (hereinafter sometimes referred to as "XD10") (see patent document 1), which has been highly expected as a material for various parts especially in recent years because of its excellent chemical resistance and impact resistance.

However, MXD6 and XD10 crystallize more slowly than polyamide 6 and polyamide 66. Thus, it is difficult to allow MXD6 or XD10 alone to crystallize in a mold during injection molding so that it is very difficult to mold it into an article having a thin wall, and the resulting molded article is associated with problems including deformation and mechanical strength loss as well as great variation between lots of the molding in mechanical properties such as flexural strength, flexural modulus and impact resistance. Therefore, it was necessary to improve moldability by adding polyamide 66 having a high crystallization rate or a crystallization promoter such as talc powder to increase the crystallization rate or by increasing the mold temperature in order that MXD6 or XD10 could be used as a molding material (patent document 2). However, there was a limitation on the amount of the additives that could be incorporated because the incorporation of polyamide 66 invites greater property changes in a humid environment as compared with the case where MXD6 or XD10 is used alone or the incorporation of talc powder causes mechanical strength loss. Moreover, it was difficult to stably produce precision parts especially having a region of 1 mm or less in thickness by applying previously proposed MXD6 or XD10 because it did not homogeneously flow in a mold due to its crystallization rate and flowability as well as viscosity stability during the residence in the molten state and caused variation in the shape of the molded article or other problems.

Under these circumstances, there have been high demands for thin-wall articles that can be stably produced with little variation in mechanical properties such as flexural strength, flexural modulus and impact resistance.

REFERENCES

Patent Documents

Patent document 1: JP-A S63-137956;
Patent document 2: JP-B S54-32458.

SUMMARY OF THE INVENTION

Problems to be Solved by the Invention

Under the circumstances as described above, an object of the present invention is to provide thin-wall articles that are formed by molding a polyamide resin or a polyamide resin composition containing the polyamide resin and that can be stably produced with little variation in mechanical properties such as flexural strength, flexural modulus and impact resistance.

Means for Solving the Problems

As a result of careful studies to attain the above object, we accomplished the present invention on the basis of the finding that a polyamide resin synthesized from xylylenediamine and a dicarboxylic acid or a polyamide resin composition containing the polyamide resin can be molded with stable moldability, stable productivity and good flowability to give thin-wall articles having little variation in mechanical properties such as flexural strength, flexural modulus and impact resistance if the polyamide resin has specific melt viscosity characteristics.

Accordingly, the present invention provides thin-wall articles and processes for manufacturing the thin-wall articles and the like as described below.
[1] A thin-wall article formed by molding a polyamide resin (C) obtained by polycondensing a diamine (A) and a dicarboxylic acid (B) or a polyamide resin composition containing the polyamide resin,
wherein 70 mol % or more of a diamine structural unit is derived from xylylenediamine and the polyamide resin has a melt viscosity (i) of 50 to 200 Pa·s as measured at a temperature of the melting point plus 10° C. for a holding time of 6 minutes at a shear rate of 122 sec$^{-1}$.
[2] The thin-wall article according to [1], wherein the polyamide resin (C) has a melt viscosity (ii) of 50 to 200 Pa·s as measured at a temperature of the melting point plus 10° C. for a holding time of 15 minutes at a shear rate of 122 sec$^{-1}$.
[3] The thin-wall article according to [2], wherein the difference between the melt viscosity (i) and the melt viscosity (ii) is 100 Pa·s or less.
[4] The thin-wall article according to any one of [1] to [3], wherein the polyamide resin (C) has a molecular weight distribution of 2.1 to 3.1.
[5] The thin-wall article according to any one of [1] to [4], wherein the polyamide resin (C) contains 0.5 to 5% by mass of a component having a molecular weight 1,000 or less.

[6] The thin-wall article according to any one of [1] to [5], wherein the polyamide resin (C) has a crystallization half time of 1 to 100 seconds.

[7] The thin-wall article according to any one of [1] to [6], wherein the polyamide resin (C) has a crystallization heat of 5 to 50 J/g.

[8] The thin-wall article according to any one of [1] to [7], wherein the xylylenediamine is m-xylylenediamine, p-xylylenediamine or a mixture of m-xylylenediamine and p-xylylenediamine.

[9] The thin-wall article according to any one of [1] to [8], wherein the dicarboxylic acid (B) is sebacic acid.

[10] The thin-wall article according to any one of [1] to [9], wherein the polyamide resin composition contains 10 to 100 parts by mass of a fibrous filler (D) per 100 parts by mass of the polyamide resin (C).

[11] The thin-wall article according to any one of [1] to [10], wherein the polyamide resin composition contains 0.1 to 10 parts by mass of a nucleating agent (E) per 100 parts by mass of the polyamide resin (C).

[12] The thin-wall article according to any one of [1] to [11], wherein the polyamide resin composition contains 0.01 to 1 part by mass of a stabilizer (F) per 100 parts by mass of the polyamide resin (C).

[13] The thin-wall article according to any one of [1] to [12], which is a molded article selected from electric connectors, insulating spacers, electric/electronic enclosures, circuit boards, gaskets, reflectors for LED, LED mounting boards and heat sink elements.

[14] A process for manufacturing a thin-wall article, comprising injection-molding a polyamide resin (C) obtained by polycondensing a diamine (A) and a dicarboxylic acid (B) or a polyamide resin composition containing the polyamide resin, wherein 70 mol % or more of a diamine structural unit is derived from xylylenediamine and the polyamide resin has a melt viscosity (i) of 50 to 200 Pa·s as measured at a temperature of the melting point plus 10° C. for a holding time of 6 minutes at a shear rate of 122 sec$^{-1}$, and wherein an inlet temperature (Tin) and an outlet temperature (Tout) of a cylinder in which the polyamide resin (C) or a polyamide resin composition containing the polyamide resin is melted satisfy the following relation (1):

$$Tout \geq Tin+20° C. \quad (1).$$

[15] The process for manufacturing a thin-wall article according to [14], wherein the inlet temperature (Tin) and the outlet temperature (Tout) of the cylinder satisfy the following relations (2) and (3) with the melting point (Tm) of the polyamide resin (C):

$$Tm+60° C. \geq Tout \geq Tm+10° C. \quad (2)$$

$$Tm+40° C. \geq Tin \geq Tm-50° C. \quad (3).$$

Advantages of the Invention

According to the present invention, thin-wall articles that are formed by molding a polyamide resin or a polyamide resin composition containing the polyamide resin and that can be stably produced with little variation in mechanical properties such as flexural strength, flexural modulus and impact resistance can be provided.

THE BEST MODE FOR CARRYING OUT THE INVENTION

The thin-wall articles of the present invention are characterized in that they are formed by molding a polyamide resin (C) obtained by polycondensing a diamine (A) and a dicarboxylic acid (B) or a polyamide resin composition containing the polyamide resin wherein 70 mol % or more of a diamine structural unit is derived from xylylenediamine and the polyamide resin has a melt viscosity (i) of 50 to 200 Pa·s as measured at a temperature of the melting point plus 10° C. for a holding time of 6 minutes at a shear rate of 122 sec$^{-1}$.

They are also characterized in that the polyamide resin (C) preferably has a melt viscosity (ii) of 50 to 200 Pa·s as measured at a temperature of the melting point plus 10° C. for a holding time of 15 minutes at a shear rate of 122 sec$^{-1}$, and they are further characterized in that the difference between the melt viscosity (i) and the melt viscosity (ii) is 100 Pa·s or less.

The thin-wall articles of the present invention are formed by molding such a polyamide resin (C) or a polyamide resin composition containing the polyamide resin.

As used herein, the polyamide resin (C) refers to a polyamide resin material comprising a polymer derived from a diamine and a dicarboxylic acid in combination with components derived from additives incorporated to synthesize the polymer.

Polyamide resins used in the present invention, polyamide resin compositions containing them, thin-wall articles and preparation processes thereof will now be explained in detail below. As used herein, the term "to" means to include the values indicated before and after it as lower and upper limits unless otherwise specified.

As used herein, atmospheric pressure refers to 0.101325 MPa.

The polyamide resin (C) used in the present invention is a xylylenediamine-based polyamide resin obtained by polycondensing a diamine (A) and a dicarboxylic acid (B) and containing 70 mol % or more of a diamine structural unit derived from xylylenediamine. Preferably, it is a xylylenediamine-based polyamide resin containing 70 mol % or more, more preferably 80 mol % or more of a diamine structural unit (a structural unit derived from a diamine) derived from m-xylylenediamine and/or p-xylylenediamine and also preferably containing 50 mol % or more, more preferably 70 mol % or more, especially preferably 80 mol % or more of a dicarboxylic acid structural unit (a structural unit derived from a dicarboxylic acid) derived from a straight chain aliphatic α,ω-dicarboxylic acid preferably containing 4 to 20 carbon atoms. The proportions of m-xylylenediamine and p-xylylenediamine preferably consist of 0 to 100 mol % of m-xylylenediamine and 100 to 0 mol % of p-xylylenediamine, more preferably 0 to 80 mol % of m-xylylenediamine and 100 to 20 mol % of p-xylylenediamine, even more preferably 0 to 70 mol % of m-xylylenediamine and 100 to 30 mol % of p-xylylenediamine, especially preferably 0 to 50 mol % of m-xylylenediamine and 100 to 50 mol % of p-xylylenediamine.

Examples of diamines other than m-xylylenediamine and p-xylylenediamine that can be used as starting diamines of the xylylenediamine-based polyamide resin may include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decane and bis(aminomethyl)tricyclodecane; diamines having an aromatic ring such as bis(4-aminophenyl)ether, p-phenylenediamine and bis(aminomethyl)naphthalene and the like; and they can be used alone or as a mixture of two or more of them.

When a diamine other than xylylenediamine is used as a starting diamine, it should preferably be used at a proportion of less than 30 mol %, more preferably 1 to 25 mol %, especially preferably 5 to 20 mol % of the diamine structural unit.

Examples of preferred straight chain aliphatic α,ω-dicarboxylic acids containing 4 to 20 carbon atoms for use as starting dicarboxylic acids of the polyamide resin (C) may include, for example, aliphatic dicarboxylic acids such as succinic acid, glutaric acid, pimelic acid, suberic acid, azelaic acid, adipic acid, sebacic acid, undecanoic diacid, dodecanoic diacid and the like, and they can be used alone or as a mixture of two or more of them, among which adipic acid or sebacic acid, especially sebacic acid is preferred because the resulting polyamide resin has a melting point in a range appropriate for molding as well as good gas barrier properties.

When sebacic acid is used as a straight chain aliphatic α,ω-dicarboxylic acid, it preferably has a sulfur atom concentration of 1 to 200 ppm by mass, more preferably 10 to 150 ppm by mass, especially preferably 20 to 100 ppm by mass. When it is in the above ranges, the increase in yellowness index (YI) can be reduced during the synthesis of the polyamide resin. The increase in YI during melt molding of the polyamide resin can also be reduced so that the YI of the resulting article can be decreased.

Sebacic acid also preferably has a sodium atom concentration of 1 to 500 ppm by mass, more preferably 10 to 300 ppm by mass, especially preferably 20 to 200 ppm by mass. When it is in the above ranges, the polyamide resin can be synthesized with good reactivity and readily controlled in an appropriate molecular weight range and the amount of alkali metal compounds added to control the amidation reaction speed described later can be reduced. Moreover, the increase in viscosity during melt molding of the polyamide resin can be reduced so that moldability improves and char can be prevented during molding, whereby the resulting article tends to have good quality. Additionally, the polyamide resin tends to be less likely to generate die buildup such as the so-called die bleed when it is compounded with a glass filler or the like.

Such sebacic acid is preferably derived from a plant. Polyamide resins containing sebacic acid derived from a plant as a structural unit have a low YI without adding any antioxidant and the resulting articles also have a low YI because plant-derived sebacic acid contains impurities such as sulfur compounds and sodium compounds. Plant-derived sebacic acid is preferably used without excessively purifying impurities. The elimination of the necessity of excessive purification is also advantageous in terms of cost.

The purity of plant-derived sebacic acid is preferably 99 to 100% by mass, more preferably 99.5 to 100% by mass, even more preferably 99.6 to 100% by mass. These ranges are preferred, because the resulting polyamide resins have good quality and good mechanical properties such as flexural strength and Charpy impact strength and polymerization is not affected.

For example, the amount of dicarboxylic acids such as 1,10-decamethylenedicarboxilic acid contained in sebacic acid is preferably 0 to 1% by mass, more preferably 0 to 0.7% by mass, even more preferably 0 to 0.6% by mass. These ranges are preferred, because the resulting polyamide resins have good quality and polymerization is not affected.

The amount of monocarboxylic acids such as octanoic acid, nonanoic acid and undecanoic acid contained in sebacic acid is preferably 0 to 1% by mass, more preferably 0 to 0.5% by mass, even more preferably 0 to 0.4% by mass. These ranges are preferred, because the resulting polyamide resins have good quality and polymerization is not affected.

The hue (APHA) of sebacic acid is preferably 100 or less, more preferably 75 or less, even more preferably 50 or less. These ranges are preferred, because the resulting polyamide resins have a low YI. As used herein, APHA can be determined by the Standard Methods for the Analysis of Fats, Oils and Related Materials defined by the Japan Oil Chemist's Society.

Examples of dicarboxylic acids other than the straight chain aliphatic α,ω-dicarboxylic acids containing 4 to 20 carbon atoms described above include phthalic acid compounds such as isophthalic acid, terephthalic acid and orthophthalic acid; isomeric naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid and the like; and they can be used alone or as a mixture of two or more of them.

A preferred dicarboxylic acid for use as a starting dicarboxylic acid other than the straight chain aliphatic α,ω-dicarboxylic acids containing 4 to 20 carbon atoms is isophthalic acid because of moldability and barrier properties. The proportion of isophthalic acid is preferably less than 30 mol %, more preferably 1 mol % or more to less than 30 mol %, especially preferably in the range of 5 to 20 mol % of the dicarboxylic acid structural unit.

The polyamide resin (C) is most preferably a poly (m-xylylene sebacamide) resin, a poly (p-xylylene sebacamide) resin, and a mixed poly (m-/p-xylylene sebacamide) resin obtained by polycondensing a mixed xylylenediamine of m-xylylenediamine and p-xylylenediamine with sebacic acid. Especially, it is preferably a poly (p-xylylene sebacamide) resin, and a mixed poly(m-/p-xylylene sebacamide) resin obtained by polycondensing a mixed xylylenediamine of m-xylylenediamine and p-xylylenediamine with sebacic acid.

The polyamide resin (C) used in the present invention has a melt viscosity (i) of 50 to 200 Pa·s as measured under conditions of a shear rate of 122 $\sec^{-1}$ when it is held in the molten state at a temperature 10° C. higher than the melting point for 6 minutes. The melt viscosity (i) is preferably 60 to 190 Pa·s, more preferably 70 to 180 Pa·s, even more preferably 80 to 170 Pa·s, especially preferably 90 to 160 Pa·s. Xylylenediamine-based polyamide resins having a melt viscosity (i) of less than 50 Pa·s when held at the melting point plus 10° C. for 6 minutes exhibit considerably low viscosity during melt processing and therefore low moldability so that the resulting articles have uneven performance and if thin-wall articles are obtained, their mechanical properties tend to be very poor. However, those having the viscosity exceeding 200 Pa·s may solidify in incomplete forms without completely filling the mold cavity during injection molding, which makes it difficult to stably obtain thin-wall articles having a good shape.

The polyamide resin (C) also preferably has a melt viscosity (ii) of 50 to 200 Pa·s as measured under conditions of a shear rate of 122 $\sec^{-1}$ when it is held in the molten state at a temperature 10° C. higher than the melting point for 15 minutes. The melt viscosity (ii) is more preferably 60 to 190 Pa·s, even more preferably 70 to 180 Pa·s, especially preferably 80 to 170 Pa·s. If the polyamide resin has a melt viscosity (ii) in the above ranges when it is held at the melting point plus 10° C. for 15 minutes, thin-wall articles having better mechanical properties can be more stably obtained. More specifically, the resin shows neither decrease in molecular weight due to deterioration of the resin during the residence in the molten state nor increase in molecular weight due to advanced polymerization of the resin during the residence in the molten state but completely fills the mold cavity so that thin-wall articles having good mechanical properties and shape can be obtained.

Moreover, the polyamide resin (C) preferably has a difference between the melt viscosity (i) and the melt viscosity (ii) of 100 Pa·s or less, more preferably 70 Pa·s or less, even more preferably 50 Pa·s or less, especially preferably 30 Pa·s or less.
If the difference between the melt viscosities (i) and (ii) is in the above ranges, thin-wall articles can be obtained more stably. More specifically, if the difference is in such ranges, the resin undergoes little change in viscosity during the residence in the molten state and therefore can be molded under stable conditions during molding, whereby the resin completely fills the mold cavity so that thin-wall articles having good mechanical properties and shape can be obtained. Moreover, die buildup such as the so-called die drool can be reduced so that moldability improves.
The melt viscosity (i) may be higher than the melt viscosity (ii) or vice versa, but especially preferably the melt viscosity (i) equals the melt viscosity (ii).

The melt viscosities (i) and (ii) were measured using Capillograph D-1 (available from Toyoseiki Seisaku-sho, Ltd.) equipped with a cylinder (inner diameter 1 mm, length 10 mm) at a temperature 10° C. higher than the melting point of the polyamide resin (C) and a shear rate of 122/sec at 6 minutes and 15 minutes after a test sample loaded into the cylinder had begun to melt. During the analysis, the moisture content of the polyamide resin (C) was controlled at 600 ppm by mass or less. The moisture content can be determined by the Karl Fischer method at the melting point of the resin minus 5° C. for 30 minutes.

The melt viscosities can be controlled by appropriately selecting the inlet ratio of starting dicarboxylic acid and diamine, the polymerization catalyst and the molecular weight modifier during the preparation of the polyamide resin (C) to choose conditions including a low polymerization temperature and a short polymerization time, as described later. Especially for achieving the melt viscosity characteristics in the above ranges, it is important to optimize polymerization conditions by, for example, selecting a short polymerization time, or controlling the inlet ratio of diamine/dicarboxylic acid to provide an excess of carboxylic acid, or regulating the degree of vacuum at 0.08 to 0.1 MPa during polymerization or the like.

The polyamide resin (C) also preferably has a molecular weight distribution (weight average molecular weight/number average molecular weight (Mw/Mn)) of 2.1 to 3.1, more preferably 2.2 to 3.0, even more preferably 2.3 to 2.9. Molecular weight distributions in such ranges allow for a good balance between heat resistance and moldability of thin-wall articles.
The molecular weight distribution of the polyamide resin (C) can be controlled by, for example, appropriately selecting the types and amounts of initiators and catalysts used during polymerization as well as polymerization reaction conditions such as reaction temperature, pressure, period and the like, and the molecular weight distribution can be effectively reduced to such a low range as 2.1 to 3.1 by controlling the inlet ratio of diamine/dicarboxylic acid to provide a polyamide resin containing a slight molar excess of carboxylic acid, or adding a monocarboxylic acid as a molecular weight modifier, or selecting a low polymerization reaction temperature or a short polymerization reaction time or the like.

The molecular weight distribution can be determined by conventional methods such as gel permeation chromatography (GPC), specifically as a relative value equivalent to the molecular weight distribution of poly (methyl methacrylate) used as a standard by employing the instrument "HLC-8320GPC" available from Tosoh Corporation and two "TSK gel Super HM-H" columns available from Tosoh Corporation eluting with 10 mmol/l sodium trifluoroacetate in hexafluoroisopropanol (HFIP) under conditions of a resin concentration of 0.02% by mass, a column temperature of 40° C., a flow rate of 0.3 ml/min and detection with a refractive index detector (RI).

Moreover, the polyamide resin (C) preferably contains 0.5 to 5% by mass of components having a molecular weight of 1,000 or less (preferably components having a molecular weight of 100 to 1000). Such low molecular weight components contained in such a range tend to improve flowability of the resin in thin-wall regions in the mold during molding of a thin-wall article to prevent premature solidification and improve the shape of the resulting molded article. If the content of the low molecular weight components exceeds 5% by mass, they tend to bleed to result in low strength and poor surface appearance. If it is in this range, these components are thought to function as self-nucleating agents to increase the crystallization rate of the polyamide resin (C). The content of components having a molecular weight of 1,000 or less is preferably 0.6 to 4.5% by mass, more preferably 0.7 to 4% by mass, even more preferably 0.8 to 3.5% by mass, especially preferably 0.9 to 3% by mass, most preferably 1 to 2.5% by mass.

The content of low molecular weight components having a molecular weight of 1,000 or less can be controlled by regulating melt polymerization conditions such as the temperature or pressure at which the polyamide resin is synthesized or the speed at which a diamine is added dropwise. Especially, the content can be controlled at any proportion by depressurizing the inside of the reactor to remove the low-molecular weight components at a late stage of melt polymerization. Alternatively, the low-molecular weight components may be removed by extracting the polyamide resin prepared by melt polymerization with hot water or the low-molecular weight components may be removed by further solid-phase polymerization under reduced pressure after melt polymerization. They can be controlled at any content by regulating the temperature or the degree of vacuum during the solid-phase polymerization.

The content of components having a molecular weight of 1,000 or less was determined as a relative value equivalent to the content of PMMA by GPC by employing the instrument "HLC-8320GPC" available from Tosoh Corporation and "TSK gel Super HM-H" columns available from Tosoh Corporation using 10 mmol/l sodium trifluoroacetate in hexafluoroisopropanol (HFIP) as a solvent at a test temperature of 40° C. A calibration curve was generated from measurements of six PMMA standards dissolved in HFIP.

The polyamide resin (C) also preferably has a crystallization half time in the range of 1 to 100 seconds. Such a range promotes crystallization during molding to readily shorten the molding cycle. If the crystallization half time exceeds 100 seconds, the crystallization rate tends to be too low to achieve crystallization during molding, which makes it difficult to obtain thin-wall articles with excellent properties. When a resin composition is injected into a mold cavity to form a thin-wall article, it is cooled more rapidly than the case where a thick-wall article is to be formed. To promote crystallization of the polyamide resin (C), a certain degree of temperature is required to promote molecular motion, but if cooling proceeds rapidly, the so-called quenched state occurs to retard crystallization. Thus, rapid crystallization is advantageous especially for thin-wall articles.

The crystallization half time is more preferably 1 to 50 seconds, even more preferably 2 to 30 seconds, especially preferably 3 to 10 seconds.

The crystallization half time was determined by the depolarized light intensity technique in silicone oil at a temperature of 160° C. by using the crystallization kinetics analyzer (model MK701) available from Kotaki Seisakusho Ltd. immediately after the polyamide resin in the form of a film of 100 μm in thickness was melted at the melting point plus 20° C. for 2 minutes.

The polyamide resin (C) also preferably has a crystallization heat of 5 to 50 J/g. The crystallization heat refers to a heat generated by a molten resin when it crystallizes, and if the crystallization heat is within the above range, crystallization of thin-wall articles proceeds enough far to improve mechanical properties of the articles. The crystallization heat is more preferably 10 to 50 J/g, even more preferably 20 to 50 J/g, especially preferably 30 to 50 J/g.

The melting point of the polyamide resin (C) is preferably 150 to 310° C., more preferably 160 to 300° C. When it is in the above ranges, moldability during molding of thin-wall articles improves. Especially for applications requiring heat resistance, the melting point is preferably 250 to 310° C., 265 to 310° C., or 280 to 300° C. These ranges are preferred because resistance to soldering heat increases to facilitate soldering and to improve moldability.

Moreover, the glass transition point of the polyamide resin (C) is preferably 60 to 100° C., more preferably 70 to 100° C., even more preferably 75 to 100° C. When it is in the above ranges, heat resistance tends to improve.

As used herein, the crystallization heat, melting point and glass transition point refer to the crystallization heat, melting point and glass transition point that can be determined by differential scanning calorimetry (DSC) by melting a sample by heating it once, then rapidly cooling it and heating it again. Specifically, a polyamide resin sample is melted by heating from 30° C. to a temperature equal to or higher than an expected melting point, typically to a temperature of an expected melting point plus 30° C. at a rate of 10° C./min, and then rapidly cooled. Then, the sample is heated to a temperature equal to or higher than the melting point at a rate of 10° C./min, whereby the crystallization heat, glass transition point and melting point can be determined. When two or more melting peaks occur, the peak at a higher temperature is taken as the melting point.

The polyamide resin (C) used in the present invention can be obtained by polycondensing a diamine containing 70 mol % or more of xylylenediamine and a dicarboxylic acid, and can be prepared by any processes including, but not specifically limited to, melt polymerization such as atmospheric pressure melt polymerization, high pressure melt polymerization and the like.

For example, it is prepared by heating a polyamide salt composed of a diamine such as m-xylylenediamine and a dicarboxylic acid such as adipic acid or sebacic acid in the presence of water under pressure to polymerize it in the molten state while removing the water added and condensed water. It may also be prepared by directly adding xylylenediamine or the like to a dicarboxylic acid in the molten state to polycondense them at atmospheric pressure or under pressure.

Polycondensation takes place by continuously or intermittently adding a diamine under pressure while stirring a dicarboxylic acid in the molten state in a reaction vessel. The temperature of the reaction mixture should preferably be controlled within a range from the melting point to the melting point plus 30° C. to maintain the reaction mixture in the molten state by sequentially raising the temperature of the reaction mixture during addition of the diamine. If the temperature of the reaction mixture decreases below its melting point, the reaction mixture may solidify in the reaction vessel, but if it exceeds the melting point plus 30° C., the reaction mixture may be disadvantageously deteriorated. At the end of the addition, the temperature of the reaction mixture should preferably be controlled at a temperature equal to or higher than the melting point of a desired polyamide resin while maintaining the reaction mixture in the molten state. The melting point of the reaction mixture can be sequentially determined by DSC or the like as appropriate.

The speed at which a diamine is added is chosen to maintain the reaction system in a homogeneous molten state by considering the heat generated by amidation reaction, the heat consumed to distill off the generated condensed water, the heat supplied from the heat medium to the reaction mixture through the wall of the reaction vessel, the structure of the part separating the generated condensed water and starting compounds and the like. The time required for adding a diamine depends on the scale of the reaction vessel, but typically ranges from 0.5 to 5 hours. During then, the condensed water generated with the progress of the reaction is distilled off from the reaction system. The amount of volatile starting materials such as a diamine and a dicarboxylic acid separated from the condensed water and returned to the reaction vessel can be controlled by, for example, controlling the temperature in the reflux column in an optimal range or appropriately controlling the shapes and amounts of packings in the packed column such as the so-called Raschig rings, Lessing rings and saddles. The starting materials and the condensed water are preferably separated by a partial condenser, and the condensed water is preferably distilled off through a total condenser.

The pressure in the reaction vessel during polycondensation reaction is preferably 0.1 to 0.6 MPa, more preferably 0.2 to 0.5 MPa. Pressurization may be achieved by supplying an inert gas such as nitrogen or vapor of the condensed water generated during the reaction.

After completion of the addition of the diamine, the pressure may be lowered and when atmospheric pressure is reached, polycondensation reaction may be ended or polycondensation reaction may be further continued for a predetermined period at atmospheric pressure or under negative pressure and then ended. When polycondensation reaction is further continued under negative pressure, the pressure in the reaction system is preferably lowered finally to 0.08 MPa or less. The time from the end of addition to the start of depressurization is not specifically limited, but depressurization is preferably started within 30 minutes after completion of the dropwise addition. The depressurization rate is chosen to prevent unreacted diamine from being distilled off with water from the system during depressurization, for example in the range of 0.1 to 1 MPa/hr. It is not preferable to choose a low depressurization rate because the resulting polyamide resin may be thermally deteriorated due to not only increased time required for manufacturing it but also increased time required for depressurization.

The temperature at which polycondensation reaction is further continued at atmospheric pressure or under negative pressure after completion of the dropwise addition is preferably a temperature at which the resulting polyamide cannot solidify, i.e., in a range from the melting point of the resulting polyamide resin to the melting point plus 30° C.

The melt polycondensation takes place in the presence of a polymerization catalyst. The polymerization catalyst may be a phosphorus compound such as phosphoric acid, phosphorous acid or hypophosphorous acid, or a salt or ester compound thereof. Examples of salts include salts of metals such as potassium, sodium, magnesium, calcium, zinc, cobalt, manganese, tin, tungsten, vanadium, germanium, titanium and antimony and ammonium salts. Examples of ester compounds include ethyl esters, isopropyl esters, butyl esters, hexyl esters, octadecyl esters, stearyl esters, phenyl esters and the like.

To prevent the polymerization catalyst mentioned above from aggregating in the polyamide resin or inducing an abnormal reaction by thermal deterioration or the like, the polymerization catalyst may be used in combination with an alkali metal compound or an alkaline earth metal compound. Specific examples thereof include, but not limited to, alkali metal hydroxides and alkaline earth metal hydroxides such as sodium hydroxide, calcium hydroxide, potassium hydroxide and magnesium hydroxide; and alkali metal salts and alkaline earth metal salts of carbonic acid, boronic acid, acetic acid, propionic acid, butyric acid, isobutyric acid, crotonic acid, valeric acid, caproic acid, isocaproic acid, enanthic acid, caprylic acid, pelargonic acid, stearic acid, cyclopentanecarboxylic acid, cyclohexanecarboxylic acid, hydrocinnamic acid, γ-phenylbutyric acid, p-phenoxybenzoic acid, o-oxycinnamic acid, o-β-chlorophenylpropionic acid and m-chlorophenylpropionic acid.

The polyamide resin (C) used in the present invention as described above can be obtained by choosing the melt polymerization conditions described above, preferably in combination with the method of: (1) reducing the polymerization time, (2) controlling the inlet ratio of diamine/dicarboxylic acid to provide a slight excess of carboxylic acid, (3) regulating the degree of vacuum during polymerization, or (4) controlling the polymerization temperature at the melting point plus 30° C. or less or a combination thereof.

The method (1) above takes place in the reaction process of a diamine and a dicarboxylic acid as follows: after completion of the addition of the diamine under pressure (for example, 0.15 to 0.6 MPa), the pressure is lowered and when nearly atmospheric pressure (for example, 0.10 to 0.15 MPa, preferably 0.10 to 0.12 MPa) is reached, polycondensation reaction is ended or polycondensation reaction is further continued at nearly atmospheric pressure (for example, 0.10 to 0.15 MPa) or under negative pressure (for example, 0.05 MPa or more to less than 0.15 MPa, or 0.05 MPa or more to less than 0.12 MPa) for a predetermined time and then ended. The time from the instant at which atmospheric pressure is reached to the end of the reaction is controlled to preferably more than 0 minute to 60 minutes or less, more preferably more than 0 minute to 30 minutes or less, even more preferably more than 0 minute to 20 minutes or less, especially preferably more than 0 minute to 10 minutes or less. The reaction temperature at which polycondensation reaction is continued at atmospheric pressure or under negative pressure for a predetermined time is preferably from the melting point to the melting point plus 30° C., more preferably from the melting point to the melting point plus 20° C. The melting point indicated above refers to the temperature at the top of an endothermic peak on the higher temperature side among endothermic peaks observed by DSC.

The method (2) above involves controlling the inlet ratio of diamine/dicarboxylic acid to provide a slight excess of carboxylic acid, specifically preferably controlling the reaction molar ratio (r) defined by the equation below in the ranges below. The polyamide resin (C) preferably has a molar ratio of reacted diamine to reacted dicarboxylic acid (the number of moles of reacted diamine/the number of moles of reacted dicarboxylic acid) of 0.96 to 0.995, more preferably 0.97 to 0.985, even more preferably 0.975 to 0.982. When the reaction molar ratio is in the above ranges, the melt viscosities can readily be controlled in the ranges described above.

The reaction molar ratio (r) here is determined by the equation below:

$$r=(1-cN-b(C-N))/(1-cC+a(C-N))$$

wherein $a=M_1/2$, $b=M_2/2$, $c=18.015$, $M_1$ is the molecular weight of the diamine (g/mol) $M_2$ is the molecular weight of the dicarboxylic acid (g/mol), N is the terminal amino group concentration (eq/g), and C is the terminal carboxyl group concentration (eq/g). The reaction molar ratio (r) can be stoichiometrically calculated in amidation reaction. For example, it can be determined following the description in "3.2.1 Analysis based on secondary reaction schemes" in "3.2 Analysis of Experimental Results" in the Journal of Industrial Chemistry, vol. 74, No. 7 (1971), pp. 165-166.

It should be understood that when a polyamide resin is synthesized from diamine and dicarboxylic acid monomers having different molecular weights, $M_1$ and $M_2$ are calculated depending on the proportions (molar ratio) of the starting monomers. It should also be understood that if the synthesis vessel is a completely closed system, the molar ratio of loaded monomers equals the reaction molar ratio, but the inlet molar ratio does not always equal the reaction molar ratio because the actual synthesizer cannot be a completely closed system. Moreover, the inlet molar ratio does not always equal the reaction molar ratio because loaded monomers may not completely react. Thus, the reaction molar ratio refers to the molar ratio of actually reacted monomers determined from the terminal group concentrations of a finished polyamide resin.

The reaction molar ratio of the polyamide resin can be controlled by appropriately selecting reaction conditions such as the inlet molar ratio of starting dicarboxylic acid and diamine, reaction period, reaction temperature, the speed at which xylylenediamine is added dropwise, the degree of vacuum in the vessel, the timing of starting depressurization and the like. When the polyamide resin is prepared by the so-called salt process, a reaction molar ratio of, for example, less than 0.994 may be achieved specifically by selecting a ratio of starting diamine/starting dicarboxylic acid of less than 0.994 and allowing the reaction to proceed sufficiently far, for example. In the case of a process involving continuous dropwise addition of a diamine to a molten dicarboxylic acid, it may be achieved by not only selecting an inlet ratio of less than 0.999 but also controlling the amount of the diamine to be refluxed during the dropwise addition of the diamine and removing the added diamine outside the reaction system. Specifically, the diamine may be removed outside the system by controlling the temperature in the reflux column in an optimal range or appropriately controlling the shapes and amounts of packings in the packed column such as the so-called Raschig rings, Lessing rings and saddles. Alternatively, unreacted diamine can also be removed outside the system by reducing the reaction period after dropwise addition of the diamine. Further, unreacted diamine can also be removed outside the system as appropriate by controlling the speed at which the diamine is added dropwise. These methods allow the reaction molar ratio to be controlled in a predetermined range even if the inlet ratio is higher than 0.994.

The method (3) above involves regulating the pressure at preferably 0.05 MPa to less than atmospheric pressure (e.g., less than 0.1 MPa), more preferably 0.06 to 0.09 MPa, even more preferably 0.07 to 0.085 MPa during the step of further continuing polycondensation reaction under negative pressure for a predetermined time if such a step is adopted after completion of the addition of the diamine under pressure in the reaction process. In cases where after completion of the dropwise addition of the diamine, the pressure is lowered and when atmospheric pressure is reached, polycondensation reaction is ended or polycondensation reaction is further continued at atmospheric pressure or under negative pressure for a predetermined time, the time from the end of the addition of the diamine to the start of depressurization is not specifically limited, but depressurization is preferably started within 30 minutes, more preferably within 20 minutes, even more preferably within 10 minutes after completion of the dropwise addition. The depressurization rate is chosen to prevent unreacted diamine from being distilled off with water from the system during depressurization, for example in the range of 0.1 to 1 MPa/hr. It is not preferable to choose a low depressurization rate because the resulting polyamide resin may be thermally deteriorated due to not only increased time required for manufacturing it but also increased time required for depressurization.

The method (4) above involves controlling the temperature of the reaction solution at the melting point of the polyamide plus 30° C. or less, more preferably the melting point plus 20° C. or less, even more preferably the melting point plus 10° C. or less at the end of the reaction in cases where after completion of the addition of the diamine in the reaction process, the pressure is lowered and when atmospheric pressure is reached, polycondensation reaction is ended or polycondensation reaction is further continued at atmospheric pressure or under negative pressure for a predetermined time. When the final temperature is in the above ranges, the polymerization speed can be decreased and the melt viscosities can readily be controlled in the ranges described above.

Polyamide resin compositions used in the present invention can also contain polyamide resins other than xylylenediamine-based polyamide resins and elastomer components. The other polyamide resins include polyamide 66, polyamide 6, polyamide 46, polyamide 6/66, polyamide 10, polyamide 612, polyamide 11, polyamide 12, polyamide 66/6T composed of hexamethylenediamine, adipic acid and terephthalic acid, and polyamide 6I/6T composed of hexamethylenediamine, isophthalic acid and terephthalic acid, etc.

Elastomer components that can be used include, for example, known elastomers such as polyolefin elastomers, diene elastomers, polystyrene elastomers, polyamide elastomers, polyester elastomers, polyurethane elastomers, fluorinated elastomers, silicone elastomers and the like, preferably polyolefin elastomers and polystyrene elastomers.

These elastomers also preferably include those modified with α, β-unsaturated carboxylic acids and their anhydrides, acrylamides and derivatives thereof in the presence or absence of a radical initiator to impart compatibility with the polyamide resin (C).

The content of such other polyamide resin or elastomer components is typically 30% by mass or less, preferably 20% by mass or less, especially 10% by mass or less.

The polyamide resin compositions may further contain combinations of various materials including, but not limited to, additives such as heat stabilizers, weather stabilizers, UV absorbers, inorganic fillers, nucleating agents, plasticizers, flame retardants, antistatic agents, discoloration inhibitors, anti-gelling agents, lubricants, matting agents and the like so far as the benefits of the present invention are not affected.

The polyamide resin compositions also preferably contain a fibrous filler (D), and examples of fibrous fillers that can be used include glass fibers, milled glass fibers (milled fibers), whiskers of potassium titanate or calcium sulfate, boron fibers, boron nitride fibers, carbon fibers, alumina fibers, alumina-silica fibers, zirconia fibers and the like. The fibrous filler preferably has a diameter of 2 to 50 μm, especially 5 to 20 μm. Preferably, it has a length of 0.1 mm to 20 mm, especially 1 to 10 mm.

The content of the fibrous filler (D) is preferably 10 to 100 parts by mass per 100 parts by mass of the polyamide resin (C), if it is used. If the content of the fibrous filler is less than 10 parts by mass, a sufficient reinforcing effect is not achieved, but if it exceeds 100 parts by mass, problems occur during molding of thin-wall articles.

The polyamide resin compositions also preferably contain a nucleating agent (E), examples of which include talc powder or ceramic particles or the like. Examples of ceramic particles specifically include oxides, nitrides, carbides and borides of metals such as silicon, aluminum, titanium, zirconium, magnesium and iron. Especially preferred nucleating agents are talc and boron nitride, especially talc. Talc and ceramic particles preferably have a particle diameter of 100 μm or less, even more preferably 80 μm or less.

The amount of such a nucleating agent (E) is preferably 0.1 to 10 parts by mass per 100 parts by mass of the polyamide resin (C), if it is contained. It is not preferable to incorporate more than 30 parts by mass because of problems such as a decrease in the flowability of the resin during molding or a decline in the mechanical performance of the resulting thin-wall article.

The polyamide resin compositions also preferably contain a carbodiimide compound. Carbodiimide compounds preferably include aromatic, aliphatic or alicyclic polycarbodiimide compounds prepared by various processes. Among them, aliphatic or alicyclic polycarbodiimide compounds are preferably used, more preferably alicyclic polycarbodiimide compounds in terms of melt kneadability during extrusion or the like.

These carbodiimide compounds can be prepared by decarboxylative condensation of organic polyisocyanates. For example, they can be synthesized by decarboxylative condensation of various organic polyisocyanates at a temperature of about 70° C. or more in the presence of a carbodiimidation catalyst in an inert solvent or without using a solvent. The isocyanate content is preferably 0.1 to 5 mol %, more preferably 1 to 3 mol %. The content in the above ranges tends to facilitate the reaction with polyamide resins and to improve hydrolysis resistance.

Organic polyisocyanates that can be used as starting materials for synthesizing the carbodiimide compounds include, for example, various organic diisocyanates such as aromatic diisocyanates, aliphatic diisocyanates and alicyclic diisocyanates and mixtures thereof.

Examples of organic diisocyanates specifically include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, methylenebis(4,1-cyclohexylene)diisocyanate and the like, and two or more of them can be used in combination. Among them, dicyclohexylmethane-4,4-diisocyanate and methylenebis(4,1-cyclohexylene)diisocyanate are preferred.

To cap the ends of the carbodiimide compounds to control their degree of polymerization, terminal blocking agents such as monoisocyanates are also preferably used. Monoisocyanates include, for example, phenyl isocyanate, tolyl isocyanate, dimethylphenyl isocyanate, cyclohexyl isocyanate, butyl isocyanate, naphthyl isocyanate and the like, and two or more of them can be used in combination.

The terminal blocking agents are not limited to the monoisocyanates mentioned above, but may be any active hydrogen compounds capable of reacting with isocyanates. Examples of such active hydrogen compounds may include aliphatic, aromatic or alicyclic compounds having an —OH group such as methanol, ethanol, phenol, cyclohexanol, N-methylethanolamine, polyethylene glycol monomethyl ether and polypropylene glycol monomethyl ether; secondary amines such as diethylamine and dicyclohexylamine; primary amines such as butylamine and cyclohexylamine; carboxylic acids such as succinic acid, benzoic acid and cyclohexanecarboxylic acid; thiols such as ethyl mercaptan, allyl mercaptan and thiophenol; compounds having an epoxy group and the like, and two or more of them can be used in combination.

Carbodiimidation catalysts that can be used include, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and 3-phospholene isomers thereof; metal catalysts such as tetrabutyl titanate and the like, among which 3-methyl-1-phenyl-2-phospholene-1-oxide is preferred because of reactivity. Two or more of the carbodiimidation catalysts may be used in combination.

The content of the carbodiimide compounds is preferably 0.1 to 2 parts by mass, more preferably 0.2 to 1.5 parts by mass, even more preferably 0.3 to 1.5 parts by mass per 100 parts by mass of the polyamide resin (C). If it is less than 0.1 part by mass, it may be difficult to control the difference between the melt viscosity (i) and the melt viscosity (ii) to 100 Pa·s or less and the hydrolysis resistance of the polyamide resin composition is insufficient so that uneven delivery is more likely to occur during melt kneading, leading to insufficient melt kneading. If it exceeds 2 parts by mass, however, the viscosity of the polyamide resin composition during melt kneading significantly increases, which may impair melt kneadability and moldability.

The polyamide resin compositions used in the present invention also preferably contain a stabilizer (F). Stabilizers preferably include, for example, organic stabilizers such as phosphorus stabilizers, hindered phenol stabilizers, hindered amine stabilizers, organic sulfur stabilizers, oxanilide stabilizers and secondary aromatic amine stabilizers; and inorganic stabilizers such as copper compounds and halides; more preferably inorganic stabilizers such as copper compounds and halides as well as secondary aromatic amine stabilizers, hindered phenol stabilizers and hindered amine stabilizers in terms of processing stability during melt molding, heat aging resistance, article appearance and discoloration prevention.

Inorganic stabilizers preferably include copper compounds and halides.

Copper compounds are copper salts of various inorganic or organic acids excluding the halides described below. Copper may be either cuprous or cupric, and specific examples of copper salts include copper chloride, copper bromide, copper iodide, copper phosphate, copper stearate as well as natural minerals such as hydrotalcite, stichitite and pyrolite.

Halides used as inorganic stabilizers include, for example, alkali metal or alkaline earth metal halides; ammonium halides and quaternary ammonium halides of organic compounds; and organic halides such as alkyl halides and allyl halides, specific examples of which include ammonium iodide, stearyl triethyl ammonium bromide, benzyl triethyl ammonium iodide and the like. Among them, alkali metal halide salts such as potassium chloride, sodium chloride, potassium bromide, potassium iodide and sodium iodide are preferred.

Combinations of copper compounds and halides, especially combinations of copper compounds and alkali metal halide salts are preferred because they provide excellent effects in resistance to heat-induced discoloration and weatherability (light resistance). For example, when a copper compound is used alone, the article may be discolored in reddish brown by copper, which is not preferred for use in some applications. However, the discoloration in reddish brown can be prevented by combining the copper compound with a halide.

Secondary aromatic amine stabilizers preferably include compounds having a diphenylamine skeleton, compounds having a phenylnaphthylamine skeleton and compounds having a dinaphthylamine skeleton, more preferably compounds having a diphenylamine skeleton and compounds having a phenylnaphthylamine skeleton. Specifically, compounds having a diphenylamine skeleton include p,p'-dialkyldiphenylamine (wherein the alkyl group contains 8 to 14 carbon atoms), octylated diphenylamine, 4,4'-bis($\alpha,\alpha$-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenediamine; compounds having a phenylnaphthylamine skeleton include N-phenyl-1-naphthylamine and N,N'-di-2-naphtyl-p-phenylenediamine; and compounds having a dinaphthylamine skeleton include 2,2'-dinaphthylamine, 1,2'-dinaphthylamine and 1,1'-dinaphthylamine. Among them, 4,4'-bis($\alpha,\alpha$-dimethylbenzyl)diphenylamine, N,N'-di-2-naphtyl-p-phenylenediamine and N,N'-diphenyl-p-phenylenediamine are more preferred, among which N,N'-di-2-naphtyl-p-phenylenediamine and 4,4'-bis($\alpha,\alpha$-dimethylbenzyl)diphenylamine are especially preferred.

Phosphorus stabilizers preferably include phosphite compounds and phosphonite compounds.

Phosphite compounds include, for example, distearylpentaerythritol diphosphite, dinonylphenylpentaerythritol diphosphite, bis(2,4-di-t-butylphenyl)pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl)pentaerythritol diphosphite, bis(2,6-di-t-butyl-4-sec-butylphenyl)pentaerythritol diphosphite, bis(2,6-di-t-butyl-4-t-octylphenyl)pentaerythritoldiphosphite, bis(2,4-dicumylphenyl)pentaerythritol diphosphite and the like, among which bis(2,6-di-t-butyl-4-methylphenyl)pentaerythritol diphosphite and bis(2,4-dicumylphenyl)pentaerythritol diphosphite are preferred.

Phosphonite compounds include, for example, tetrakis(2,4-di-t-butylphenyl)-4,4'-biphenylene diphosphonite, tetrakis(2,5-di-t-butylphenyl)-4,4'-biphenylene diphosphonite, tetrakis(2,3,4-trimethylphenyl)-4,4'-biphenylene diphosphonite, tetrakis(2,3-dimethyl-5-ethylphenyl)-4,4'-biphenylene diphosphonite, tetrakis(2,6-di-t-butyl-5-ethylphenyl)-4,4'-biphenylene diphosphonite, tetrakis(2,3,4-tributylphenyl)-4,4'-biphenylene diphosphonite, tetrakis(2,4,6-tri-t-butylphenyl)-4,4'-biphenylene diphosphonite and the like, among which tetrakis(2,4-di-t-butylphenyl)-4,4'-biphenylene diphosphonite is preferred.

The content of these stabilizers (F) is preferably 0.01 to 1 part by mass, more preferably 0.01 to 0.8 parts by mass per 100 parts by mass of the polyamide resin (C).

Such a polyamide resin (C) can be preliminarily formed into pellets or powder by melt kneading or the like, and then homogeneously mixed by a Henschel mixer, ribbon blender, V-blender or the like optionally with additional components, and then kneaded in a single or multi-screw kneading extruder, roller unit, Banbury mixer, LABOPLASTOMILL (Brabender) or the like. Various components including additional components may be fed to the kneader at a time or sequentially, or a premix of two or more components selected from various components including additional components may be used.

The kneading temperature and the kneading period can be chosen as appropriate, depending on factors such as the desired resin composition and the type of kneader, but typically, the kneading temperature is preferably about 200 to 350° C. and the kneading period is about 20 minutes or less. Then, a thin-wall article can be obtained by any of various previously known molding methods. The polyamide resin (C) used in the present invention or a composition thereof is preferably used to form a thin-wall resin article by injection molding or the like because it can retain stable melt viscosity and excellent flowability.

Typically, the temperature of the resin during injection molding is preferably 200 to 330° C., more preferably 250 to 320° C., even more preferably 280 to 310° C.

Regardless of the type of molded product, the inlet temperature (Tin) and the outlet temperature (Tout) of a cylinder in which the polyamide resin (C) or a polyamide resin composition containing the polyamide resin is melted should preferably satisfy the relation (1) below:

$$Tout \geq Tin+20° C. \quad (1).$$

Crystallinity can be controlled by regulating the temperatures at the inlet and the outlet of the cylinder to satisfy this relation. The inlet temperature (Tin) and the outlet temperature (Tout) of the cylinder should also satisfy the relations (2) and (3) below with the melting point (Tm) of the polyamide resin (C):

$$Tm+60° C. \geq Tout \geq Tm+10° C. \quad (2)$$

$$Tm+40° C. \geq Tin \geq Tm-50° C. \quad (3);$$

more preferably $$Tm+40° C. \geq Tout \geq Tm+15° C.$$

$$Tm+20° C. \geq Tin \geq Tm-40° C.;$$

especially preferably $$Tm+30° C. \geq Tout \geq Tm+20° C.$$

$$Tm+10° C. \geq Tin \geq Tm-30° C.$$

It is thought that such ranges prevent the polyamide resin from being excessively melted and allow crystal nuclei from which crystallization starts to exist in proper amounts in the molten resin, which promotes crystallization and helps to control the crystallinity of the molded product.

Regardless of the type of molded product, the screw on which the resin is melted preferably has a compression ratio of 2 to 4, more preferably 2.2 to 3.6 because it promotes crystallization of the polyamide resin and helps to control the crystallinity of the molded product. The screw also preferably has a ratio of the length of the compression section to the overall length (from the feed section to the end of the compression section) of 0.1 to 0.25, more preferably 0.11 to 0.2, even more preferably 0.11 to 0.15. The use of a screw having a compression ratio and a compression sector length in such ranges is preferred because it allows crystal nuclei from which crystallization starts to exist in proper amounts in the molten resin, which promotes crystallization and helps to control the crystallinity of the molded product.

As used herein, a thin-wall article refers to a molded article having a thin-wall region of 1 mm or less in thickness wherein the total mass of the thin-wall region is 10% or more of the mass of the entire molded article without any specific limitation on the shape. Thin-wall articles of the present invention preferably have a thin-wall region of 0.8 mm or less in thickness. The lower limit of the thickness of the thin-wall region of the thin-wall articles of the present invention is not specifically limited, but for example, 0.05 mm or more. The total mass of the thin-wall region is preferably 25% or more, more preferably 50% or more of the mass of the entire molded article. Molded articles include various articles such as sheets, tubes, hoses, pipes, profile extrusions, containers, hollow containers, boxes, parts of various shapes and the like.

The thin-wall articles of the present invention can be used as molded parts for various applications requiring heat resistance and moldability, including electric/electronic equipment parts, parts of vehicles such as automobiles, general machine parts, precision machine parts and the like, and they are especially suitable as electric connectors, insulating spacers, electric/electronic equipment enclosures, circuit boards, gaskets, reflectors for LED, LED mounting boards or heat sink elements and the like.

EXAMPLES

The following examples further illustrate the present invention, but the present invention should not be construed as being limited to these examples/comparative examples.

The polyamide resins used in the Examples and Comparative examples are the polyamide resins (PA1 to PA11) prepared in Preparation examples 1 to 11 below. It should be noted that the polyamide resins prepared in Preparation examples 6, 7 and 11 (PA6, PA7 and PA11) are resins not satisfying the requirements of the polyamide resin (C) in the present invention.

Preparation Example 1

Preparation of PA1

A reaction vessel having an internal volume of 50 liters equipped with a stirrer, a partial condenser, a total condenser, a thermometer, a dropping device and a nitrogen inlet as well as a strand die was charged with precisely weighed 8950 g (44.25 mol) of sebacic acid (sulfur atom concentration 30 ppm by mass, sodium atom concentration 54 ppm by mass, purity 99.6% by mass), 5.454 g (0.03207 mol) of calcium hypophosphite, and 3.508 g (0.04276 mol) of sodium acetate. The inside of the reaction vessel was thoroughly purged with nitrogen and then pressurized with nitrogen to 0.4 MPa and heated from 25° C. to 190° C. with stirring to homogeneously melt sebacic acid over 55 minutes. Then, 5888.5 g (43.24 mol) of p-xylylenediamine (available from Mitsubishi Gas Chemical Company, Inc.) was added dropwise with stirring over 110 minutes. During then, the internal temperature in the reaction vessel was continuously raised to 297° C. During the dropwise addition step, the pressure was controlled at 0.42

MPa and the water generated was removed outside the system through the partial condenser and the total condenser. The temperature in the partial condenser was controlled in the range of 145 to 147° C. After completion of the dropwise addition of p-xylylenediamine, the pressure in the reaction vessel was lowered from 0.42 MPa to 0.12 MPa over 30 minutes to complete the polymerization reaction. During then, the internal temperature rose to 301° C. and the amount of components having a molecular weight of 1,000 or less was controlled. Then, the inside of the system was pressurized with nitrogen, and a polymer was collected in the form of a strand from the strand die at an internal temperature in the reaction vessel of 301° C. and a resin temperature of 301° C., cooled with cooling water at 20° C. and pelletized to give about 13 kg of a polyamide resin (hereinafter abbreviated as "PA1"). Analytical results of PA1 are shown in Table 1.

Preparation Example 2

Preparation of PA2

Polyamide resin 2 (hereinafter abbreviated as "PA2") was obtained under the same conditions as in Preparation example 1 except that p-xylylenediamine was used in an amount of 5900.4 g (43.32 mol) and after completion of dropwise addition of p-xylylenediamine, polycondensation reaction was continued at a pressure in the reaction vessel of 0.42 MPa for 3 minutes and then the pressure was lowered.

Analytical results of PA2 are shown in Table 1.

Preparation Example 3

Preparation of PA3

Polyamide resin 3 (hereinafter abbreviated as "PA3") was obtained under the same conditions as in Preparation example 1 except that p-xylylenediamine was used in an amount of 5942.6 g (43.63 mol) and after completion of dropwise addition of p-xylylenediamine, polycondensation reaction was continued at a pressure in the reaction vessel of 0.42 MPa for 5 minutes and then the pressure was lowered.

Analytical results of PA3 are shown in Table 1.

Preparation Example 4

Preparation of PA4

Polyamide resin 4 (hereinafter abbreviated as "PA4") was obtained under the same conditions as in Preparation example 1 except that p-xylylenediamine was used in an amount of 5960.7 g (43.77 mol) and after completion of dropwise addition of p-xylylenediamine, polycondensation reaction was continued at a pressure in the reaction vessel of 0.42 MPa for 11 minutes and then the pressure was lowered.

Analytical results of PA4 are shown in Table 1.

Preparation Example 5

Preparation of PA5

Polyamide resin 5 (hereinafter abbreviated as "PA5") was obtained under the same conditions as in Preparation example 1 except that p-xylylenediamine was used in an amount of 5972.7 g (43.86 mol) and after completion of dropwise addition of p-xylylenediamine, the pressure in the reaction vessel was lowered from 0.42 MPa to 0.12 MPa over 30 minutes; then, the pressure was lowered at a rate of 0.002 MPa/min to 0.08 MPa over 20 minutes to complete the polymerization reaction and control the amount of components having a molecular weight of 1,000 or less; then, the inside of the system was pressurized with nitrogen, and a polymer was collected in the form of a strand.

Analytical results of PA5 are shown in Table 1.

Preparation Example 6

Preparation of PA6

Polyamide resin 6 (hereinafter abbreviated as "PA6") was obtained under the same conditions as in Preparation example 1 except that p-xylylenediamine was used in an amount of 6002.9 g (44.08 mol) and after completion of dropwise addition of p-xylylenediamine, polycondensation reaction was continued at a pressure in the reaction vessel of 0.42 MPa for 20 minutes; then, the pressure in the reaction vessel was lowered from 0.42 MPa to 0.12 MPa over 30 minutes; then, the pressure was lowered at a rate of 0.002 MPa/min to 0.08 MPa over 20 minutes to complete the polymerization reaction and control the amount of components having a molecular weight of 1,000 or less; then, the inside of the system was pressurized with nitrogen, and a polymer was collected in the form of a strand. Analytical results of the polyamide resin 6 (PA6) obtained are shown in Table 1.

Preparation Example 7

Preparation of PA7

Polyamide resin 7 (hereinafter abbreviated as "PA7") was obtained under the same conditions as in Preparation example 1 except that p-xylylenediamine was used in an amount of 5870.3 g (43.10 mol). Analytical results of PA7 are shown in Table 1.

Preparation Example 8

Preparation of PA8

A reaction vessel having an internal volume of 50 liters equipped with a stirrer, a partial condenser, a total condenser, a thermometer, a dropping device and a nitrogen inlet as well as a strand die was charged with precisely weighed sebacic acid (the same as used in Preparation example 1), 5.454 g (0.03207 mol) of calcium hypophosphite, and 3.508 g (0.04276 mol) of sodium acetate. The inside of the reaction vessel was thoroughly purged with nitrogen and then pressurized with nitrogen to 0.4 MPa and heated from 25° C. to 190° C. with stirring to homogeneously melt sebacic acid over 55 minutes. Then, 5966.7 g (43.81 mol) of xylylenediamine consisting of a diamine mixture of m-xylylenediamine and p-xylylenediamine in a ratio of 7/3 (mass ratio) was added dropwise with stirring over 110 minutes. During then, the internal temperature in the reaction vessel was continuously raised to 255° C. During the dropwise addition step, the pressure was controlled at 0.42 MPa and the water generated was removed outside the system through the partial condenser and the total condenser. The temperature in the partial condenser was controlled in the range of 145 to 147° C. After completion of the dropwise addition of the diamine mixture, polycondensation reaction was continued at a pressure in the reaction vessel of 0.42 MPa for 1 minute. Then, the pressure in the reaction vessel was lowered from 0.42 MPa to 0.12 MPa over 30 minutes. During then, the internal temperature rose to 265° C. Then, the pressure was lowered at a rate of 0.002 MPa/min to 0.08 MPa over 20 minutes to complete the polymerization reaction and control the amount of components having a molecular weight of 1,000 or less. At the end of the depressurization, the temperature in the reaction vessel was 275° C. Then, the inside of the system was pressurized with nitrogen, and a polymer was collected in the form of a strand from the strand die at an internal temperature in the reaction vessel of 275° C. and a resin temperature of 275° C., cooled with cooling water at 30° C. and pelletized to give about 13 kg of polyamide resin 8 (hereinafter abbreviated as "PA8").

Analytical results of PA8 are shown in Table 1.

Preparation Example 9

Preparation of PA9

Polyamide resin 9 (hereinafter abbreviated as "PA9") was obtained under the same conditions as in Preparation example 1 except that 9023 g (44.61 mol) of sebacic acid having a sulfur atom concentration of 60 ppm by mass, a sodium atom concentration of 110 ppm by mass and a purity of 98.8% by mass was used.

Analytical results of PA9 are shown in Table 1.

Preparation Example 10

Preparation of PA10

Polyamide resin 10 (hereinafter abbreviated as "PA10") was obtained under the same conditions as in Preparation example 1 except that 8986 g (44.43 mol) of sebacic acid having a sulfur atom concentration of 0 ppm by mass, a sodium atom concentration of 50 ppm by mass and a purity of 99.2% by mass was used.

Analytical results of PA10 are shown in Table 1.

Preparation Example 11

Preparation of PA11

Polyamide resin 11 (hereinafter abbreviated as "PA11") was obtained under the same conditions as in Preparation example 8 except that the pressure was lowered at a rate of 0.002 MPa/min to 0.08 MPa over 20 minutes and then the negative pressure was maintained for another 5 minutes.

The methods used for analyzing/evaluating these resins are as follows.

(1) Melt Viscosities (i) and (ii)

The melt viscosities were measured using Capillograph D-1 (available from Toyoseiki Seisaku-sho, Ltd.) equipped with a cylinder (inner diameter 1 mm, length 10 mm) at a temperature 10° C. higher than the melting point of each polyamide resin and a shear rate of 122/sec at 6 minutes (melt viscosity (i)) and 15 minutes (melt viscosity (ii)) after a test sample loaded into the cylinder had begun to melt.

(2) Molecular Weight Distribution (Mw/Mn)

The molecular weight distribution was determined as a relative value equivalent to the molecular weight distribution of poly(methyl methacrylate) used as a standard by employing the instrument "HLC-8320GPC" available from Tosoh Corporation and two "TSK gel Super HM-H" columns available from Tosoh Corporation eluting with 10 mmol/l sodium trifluoroacetate in hexafluoroisopropanol (HFIP) under conditions of a resin concentration of 0.02% by mass, a column temperature of 40° C., a flow rate of 0.3 ml/min and detection with a refractive index detector (RI).

(3) The Content of Components Having a Molecular Weight of 1,000 or Less

It was determined as a relative value equivalent to the content of PMMA by GPC by employing the instrument "HLC-8320GPC" available from Tosoh Corporation and "TSK gel Super HM-H" columns available from Tosoh Corporation using 10 mmol/l sodium trifluoroacetate in hexafluoroisopropanol (HFIP) as a solvent at a test temperature of 40° C. A calibration curve was generated from measurements of six PMMA standards dissolved in HFIP.

(4) Crystallization Half Time

The crystallization half time was determined by the depolarized light intensity technique in silicone oil at a temperature of 160° C. by using the crystallization kinetics analyzer available from Kotaki Seisakusho Ltd. (model MK701) immediately after each polyamide resin in the form of a film of 100 μm in thickness was melted at the melting point plus 20° C. for 2 minutes.

(5) Crystallization Heat, Melting Point and Glass Transition Point

Crystallization heat, glass transition point and melting point were determined by differential scanning calorimetry (DSC) using "DSC-60" available from SHIMADZU CORPORATION when a polyamide resin sample was melted by heating from 30° C. to a temperature equal to or higher than an expected melting point at a rate of 10° C./min in a nitrogen atmosphere, then rapidly cooled with dry ice and then heated to a temperature equal to or higher than the melting point at a rate of 10° C./min.

(6) Terminal Amino Group Concentration ([$NH_2$])

In 30 ml of a phenol/ethanol (4:1) mixed solution was dissolved precisely weighed 0.5 g of each polyamide resin with stirring at 20 to 30° C. until it was completely dissolved, and then this solution was titrated with 0.01N hydrochloric acid to determine the concentration.

(7) Terminal Carboxyl Group Concentration ([COOH])

In 30 ml of benzyl alcohol was dissolved precisely weighed 0.1 g of each polyamide resin with stirring at 200° C. for about 15 minutes under a nitrogen gas stream until it was completely dissolved, and then the solution was cooled to 165° C. under a nitrogen gas stream, and 0.1 ml of a phenol red solution was added with stirring. The solution was kept at 160° C. to 165° C. and titrated with a titration solution of 0.132 g of KOH in 200 ml of benzyl alcohol (0.01 mol/l expressed as KOH content) until the endpoint was reached at which the color of the solution completely changed from yellow to red to determine the concentration.

(8) Reaction Molar Ratio

Reaction molar ratio was calculated from the concentrations above by the equation described above.

TABLE 1

|  |  | PA1 | PA2 | PA3 | PA4 | PA5 | PA6 | PA7 | PA8 | PA9 | PA10 | PA11 |
|---|---|---|---|---|---|---|---|---|---|---|---|---|
| Melt viscosity (i) | Pa · s | 54 | 90 | 135 | 165 | 188 | 300 | 30 | 76 | 55 | 60 | 221 |
| Melt viscosity (ii) | Pa · s | 60 | 86 | 121 | 130 | 141 | 190 | 40 | 100 | 49 | 58 | 190 |
| Difference between (i) and (ii) | Pa · s | 6 | 4 | 14 | 35 | 47 | 110 | 10 | 24 | 6 | 2 | 31 |

TABLE 1-continued

|  |  | PA1 | PA2 | PA3 | PA4 | PA5 | PA6 | PA7 | PA8 | PA9 | PA10 | PA11 |
|---|---|---|---|---|---|---|---|---|---|---|---|---|
| Molecular weight distribution | Mw/Mn | 2.8 | 2.7 | 2.6 | 2.6 | 2.6 | 2.5 | 3.0 | 2.4 | 2.9 | 2.8 | 2.5 |
| Mn ≤ 1,000 content | % by mass | 4.1 | 3.6 | 3.1 | 2.7 | 2.4 | 1.9 | 5.1 | 3.5 | 4.2 | 3.8 | 2.8 |
| Crystallization half time | second | 4.8 | 4.8 | 4.9 | 5.0 | 5.0 | 5.1 | 4.8 | 8.0 | 4.8 | 4.8 | 8 |
| Crystallization heat | J/g | 30 | 30 | 31 | 32 | 33 | 35 | 30 | 32 | 30 | 30 | 31 |
| Reaction molar ratio | — | 0.977 | 0.979 | 0.986 | 0.989 | 0.991 | 0.996 | 0.974 | 0.990 | 0.976 | 0.978 | 0.99 |
| Melting point | °C. | 290 | 290 | 290 | 290 | 290 | 290 | 290 | 258 | 290 | 290 | 258 |
| Glass transition point | °C. | 71 | 71 | 71 | 71 | 71 | 72 | 71 | 70 | 71 | 71 | 70 |

Examples 1 to 9, Comparative Examples 1 to 3

Starting Materials

The glass fiber, nucleating agent and stabilizers used to be compounded with the polyamide resins are as follows.

Glass fiber: Chopped strands available from Nippon Electric Glass Co., Inc. under the brand name "T-275H" (hereinafter abbreviated as "GF").

Nucleating agent: Fine-grained talc available from Hayashi-Kasei Co., Inc. under the brand name "Micron White #5000S" (hereinafter abbreviated as "talc").

Secondary aromatic amine stabilizer: N,N'-di-2-naphthyl-p-phenylenediamine available from Ouchi Shinko Chemical Industrial Co., Ltd. under the brand name "NOCRAC White" (hereinafter abbreviated as "stabilizer 1").

Inorganic stabilizer: A1:5 (mass ratio) mixture of copper chloride/potassium iodide (hereinafter abbreviated as "stabilizer 2").

(1) Preparation of Pellets of Polyamide Resin Compositions:

The polyamide resins obtained in Preparation examples 1 to 11 described above and the other components were weighed in the compositions shown in Table 2, and all the components excluding the glass fiber were blended in a tumbler and introduced into an upstream section of a twin-screw extruder ("TEM26SS" available from Toshiba Machine Co., Ltd.) and melted, and then the glass fiber was supplied from a side feeder. The extruder was set at a temperature of 320° C. upstream of the side feed section and 310° C. downstream of the side feed section and the melt was extruded under conditions of a screw speed of 350 rpm and a throughput of 30 kg MPa/hr and pelletized to prepare pellets of the polyamide resin compositions. The resulting pellets of the polyamide resin compositions were dried with dehumidified air (dew point −40° C.) at 80° C. for 8 hours.

(2) Evaluation of Flexural Strength, Flexural Modulus and Charpy Impact Strength:
<Molding of ISO Specimens>

The pellets of each polyamide resin composition obtained by the method described above were molded in the injection molding machine "100T" available from FANUC CORPORATION to form ISO specimens under conditions of the cylinder temperatures described in Table 2, a mold temperature controller set point of 130° C., an injection time of 20 seconds and a cooling time of 15 seconds while controlling the velocity/pressure switchover to occur when about 95% of the mold cavity was charged with the resin and maintaining a holding pressure of 620 kgf/cm²×25 seconds, i.e., a relatively high pressure so far as no flash occurs. A screw having a compression ratio of 2.3 was used. The resulting ISO specimens were cut at both ends according to the method described in ISO to prepare them for flexural test and Charpy impact test.

<Evaluation>

The specimens for evaluation obtained as described above were used to determine flexural strength and flexural modulus according to ISO178 standard and Charpy unnotched impact strength according to ISO179 standard. The results were shown in Table 2. Desired performance for moldings of the present invention includes a flexural strength of 180 MPa or more, a flexural modulus of 8 GPa or more, and a Charpy unnotched impact strength of 30 kJ/m² or more.

(3) Evaluation of Crystallinity:

Crystallinity was evaluated from the crystallization heat determined by the method described below.

The pellets of each polyamide resin composition obtained by the method described above were molded in the injection molding machine "100T" available from FANUC CORPORATION to form moldings by filling the resin into the cavities of molds of 100×100 mm having a thicknesses of 1 mm and 0.8 mm from a fan gate of 100 mm by 100 mm square having a thickness of 0.8 mm under conditions of the cylinder temperatures described in Table 2, a holding pressure of 620 kgf/cm²×25 seconds, an injection time of 15 seconds, and a cooling time of 30 seconds while changing the mold temperature controller set point at 80° C., 100° C. and 130° C. and controlling the metered amount and the velocity/pressure switchover point. A screw having a compression ratio of 2.3 was used. A sample of about 10 mg was cutout from the center area of each of the resulting articles and analyzed by DSC to determine crystallization heat according to JIS K7122 using "DSC-60" available from SHIMADZU CORPORATION by heating to a temperature 30° C. higher than an expected melting point at a rate of 10° C./min.

The crystallized state was evaluated from the heat at the crystallization peak observed during heating according to the standards below. Samples showing evaluation results Δ or ○ are appropriate for use as commercial articles. The results were shown in Table 2.
○: No crystallization peak during heating;
Δ: Crystallization peaks during heating with a crystallization heat of more than 0 mJ/mg and less than 5 mJ/mg.

(4) Evaluation of Flashing:

An article for evaluation of 100×100 mm having a thickness of 1 mm was formed under the same conditions as the molding conditions for the articles for evaluation in (3) above but at a mold temperature controller set point of 100° C. and the resulting article was visually observed for the presence or absence of flash. If flash occurred, the maximum length of the flash located in a region of 10 mm from the fan gate side in the resin flow direction was measured with a caliper and evaluated according to the standards below. The results were shown in Table 2.
○: Flash occurred mainly near the fan gate with flash length≤100 μm;
Δ: Flash occurred mainly near the fan gate with 100 μm<flash length 500 μm;

x: Flash occurred mainly near the fan gate with 500 μm<flash length;
xx: The mold was not completely filled with the resin so that no article could be obtained.

(5) Appearance:

An article for evaluation of 100×100 mm having a thickness of 1 mm was formed under the same conditions as the molding conditions for the articles for evaluation in (3) above. The resulting article was visually observed for the surface appearance and evaluated according to the standards below. The results were shown in Table 2.

○: Smooth surface without floating glass fibers;

Δ: Some floating glass fibers are found.

(6) Flowability:

The pellets of each polyamide resin composition obtained by the method described above were molded in the injection molding machine "J55" available from The Japan Steel Works, LTD. using a mold having a cross section of 1 mm in thickness and 5 ram in width under conditions of the cylinder temperatures described in Table 2, a mold temperature controller set point of 100° C., an injection pressure of 100 MPa and an injection time of 3 seconds over a molding cycle of 20 seconds and the spiral flow length was determined. Greater flow length can be considered to indicate better flowability and higher moldability. A screw having a compression ratio of 2.3 was used. The results were shown in Table 2.

(7) Yellowness Index (YI):

An article for evaluation of 100×100 mm having a thickness of 1 mm was formed under the same conditions as the molding conditions for the articles for evaluation in (3) above but at a mold temperature controller set point of 100° C. and YI was determined according to JIS K7105 using Z-E80 available from NIPPON DENSHOKU INDUSTRIES CO., LTD.

The results were shown in Table 2. Desired performance for articles of the present invention includes a YI of 15 or less, preferably 12 or less.

The results of the table show that the thin-wall articles of the present invention are excellent in mechanical properties such as flexural strength, flexural modulus and impact resistance as well as appearance with little flash so that they can be stably produced. In contrast, it was shown that if the melt viscosity (i) exceeds the upper limit of the present invention, flowability and flashing tend to deteriorate (Comparative example 1) or flowability and crystallized state tend to deteriorate (Comparative examples 3). However, it was shown that if the melt viscosity (i) is less than the lower limit of the present invention (Comparative examples 2), the article deteriorates in flashing and impact resistance.

INDUSTRIAL APPLICABILITY

The thin-wall articles of the present invention are formed by molding a polyamide resin having specific characteristics or a polyamide resin composition containing it and can be stably produced with little variation in mechanical properties such as flexural strength, flexural modulus and impact resistance so that they can be widely used in the fields of various molded parts including electric/electronic equipment parts, parts of vehicles such as automobiles, general machine parts, precision machine parts and the like, and therefore, they will find wide industrial applicability.

The invention claimed is:

1. A thin-wall article, which has a thin-wall region of 1 mm or less in thickness wherein a total mass of the thin-wall region is 10% or more of a mass of the thin-wall article, wherein the thin-wall article is formed by molding (i) a polyamide resin obtained by polycondensing a diamine and a dicarboxylic acid, or (ii) a polyamide resin composition comprising the polyamide resin, the polyamide resin has a diamine structural unit 70 mol % or more of which is derived from xylylenediamine, the polyamide resin has a first melt viscosity of 50 to 200 Pa·s as measured at a temperature of a melting

TABLE 2

| | | | Example | | | | | | | | | Comparative example | | |
|---|---|---|---|---|---|---|---|---|---|---|---|---|---|---|
| | | | 1 | 2 | 3 | 4 | 5 | 6 | 7 | 8 | 9 | 1 | 2 | 3 |
| Polyamide resin | | | PA1 | PA1 | PA2 | PA3 | PA4 | PA5 | PA8 | PA9 | PA10 | PA6 | PA7 | PA11 |
| GF | | parts by mass | 50 | 50 | 50 | 50 | 75 | 100 | 100 | 50 | 50 | 50 | 50 | 50 |
| Talc | | parts by mass | | 0.2 | | 0.3 | 0.5 | 0.5 | 0.5 | | | 0.2 | 0.2 | 0.2 |
| Stabilizer 1 | | parts by mass | | 0.3 | | | | 0.5 | | | | 0.2 | | |
| Stabilizer 2 | | parts by mass | | | | | | | 0.2 | | | | | |
| Flowability | | cm | 25 | 24 | 23 | 22 | 19 | 16 | 18 | 24 | 24 | 14 | 40 | 15 |
| Crystallized state | 80° C. | — | Δ | Δ | Δ | Δ | Δ | ○ | ○ | Δ | Δ | Δ | Δ | Δ |
| (thickness 0.8 mm) | 100° C. | — | Δ | ○ | Δ | ○ | ○ | ○ | ○ | Δ | ○ | ○ | ○ | Δ |
| | 130° C. | — | ○ | ○ | ○ | ○ | ○ | ○ | ○ | ○ | ○ | ○ | ○ | Δ |
| Crystallized state | 80° C. | — | Δ | ○ | Δ | ○ | ○ | ○ | ○ | Δ | ○ | ○ | ○ | Δ |
| (thickness 1 mm) | 100° C. | — | ○ | ○ | ○ | ○ | ○ | ○ | ○ | ○ | ○ | ○ | ○ | ○ |
| | 130° C. | — | ○ | ○ | ○ | ○ | ○ | ○ | ○ | ○ | ○ | ○ | ○ | ○ |
| Appearance | | — | ○ | ○ | ○ | Δ | Δ | Δ | ○ | ○ | ○ | Δ | ○ | ○ |
| Flashing | | — | Δ | Δ | Δ | ○ | ○ | ○ | Δ | Δ | Δ | x x | x | Δ |
| Charpy unnotched impact strength | | kJ/m² | 35 | 37 | 40 | 42 | 53 | 62 | 60 | 32 | 37 | 48 | 29 | 32 |
| Flexural strength | | MPa | 189 | 182 | 195 | 210 | 288 | 334 | 340 | 179 | 183 | 235 | 176 | 180 |
| Flexural modulus | | GPa | 9.3 | 9.3 | 9.3 | 9.4 | 13.1 | 16.6 | 16.7 | 9.3 | 9.3 | 9.4 | 9.3 | 9.3 |
| YI | | — | 8 | 8 | 9 | 9 | 10 | 10 | 9 | 6 | 15 | 0 | −2 | 8 |
| Tin | | ° C. | 270 | 260 | 280 | 290 | 300 | 275 | 265 | 240 | 275 | 310 | 300 | 280 |
| Tout | | ° C. | 305 | 300 | 305 | 310 | 320 | 305 | 285 | 300 | 305 | 320 | 310 | 280 |

In the table above, Tin means the inlet temperature of the cylinder and Tout means the outlet temperature of the cylinder.

point plus 10° C. for a holding time of 6 minutes at a shear rate of 122 sec⁻¹, the polyamide resin has a crystallization heat of 5 to 50 J/g, and 0.5 to 5% by mass of the polyamide resin has a molecular weight of 1,000 or less.

2. The thin-wall article of claim 1, wherein the polyamide resin has a second melt viscosity of 50 to 200 Pa·s as measured at a temperature of the melting point plus 10° C. for a holding time of 15 minutes at a shear rate of 122 sec$^{-1}$.

3. The thin-wall article of claim 2, wherein the first and second melt viscosities differ by 100 Pa·s or less.

4. The thin-wall article of claim 1, wherein the polyamide resin has a molecular weight distribution of 2.1 to 3.1.

5. The thin-wall article of claim 1, wherein the polyamide resin has a crystallization half time of 1 to 100 seconds.

6. The thin-wall article of claim 1, wherein the xylylenediamine is m-xylylenediamine, p-xylylenediamine or a mixture of m-xylylenediamine and p-xylylenediamine.

7. The thin-wall article of claim 1, wherein the dicarboxylic acid is sebacic acid.

8. The thin-wall article of claim 1, wherein the polyamide resin composition comprises 10 to 100 parts by mass of a fibrous filler per 100 parts by mass of the polyamide resin.

9. The thin-wall article of claim 1, wherein the polyamide resin composition comprises 0.1 to 10 parts by mass of a nucleating agent per 100 parts by mass of the polyamide resin.

10. The thin-wall article of claim 1, wherein the polyamide resin composition comprises 0.01 to 1 part by mass of a stabilizer per 100 parts by mass of the polyamide resin.

11. The thin-wall article of claim 1, which is selected from the group consisting of an electric connector, an insulating spacer, an electric/electronic enclosure, a circuit board, a gasket, a reflector for an LED, an LED mounting board, and a heat sink element.

12. A process for manufacturing a thin-wall article, comprising:
injection-molding a polyamide resin such that a thin-wall article is formed,
wherein the thin-wall article has a thin-wall region of 1 mm or less in thickness wherein a total mass of the thin-wall region is 10% or more of a mass of the thin-wall article, the polyamide resin is obtained by polycondensing a diamine and a dicarboxylic acid, or a polyamide composition comprising the polyamide resin,
the polyamide resin has a diamine structural unit 70 mol% or more of which is derived from xylylenediamine, the polyamide resin has a first melt viscosity of 50 to 200 Pa·s as measured at a temperature of a melting point plus 10° C. for a holding time of 6 minutes at a shear rate of 122 sec$^{-1}$, the polyamide resin has a crystallization heat of 5 to 50 J/g, and 0.5 to 5% by mass of the polyamide resin has a molecular weight of 1,000 or less, and wherein an inlet temperature, Tin, and an outlet temperature, Tout, of a cylinder in which the polyamide resin or the polyamide resin composition comprising the polyamide resin is melted satisfy the following relation (1):

$$Tout \geq Tin + 20° C. \tag{1}$$

13. The process of claim 12, wherein the inlet temperature and the outlet temperature of the cylinder satisfy the following relations (2) and (3) with the melting point, Tm, of the polyamide resin:

$$Tm + 60° C. \geq Tout \geq Tm + 10° C. \tag{2}$$

$$Tm + 40° C. \geq Tin \geq Tm - 50° C. \tag{3}$$

14. The thin-wall article of claim 1, wherein the first melt viscosity is 90 to 160 Pa·s.

15. The thin-wall article of claim 2, wherein the second melt viscosity is 80 to 170 Pa·s.

16. The thin-wall article of claim 2, wherein the first and second melt viscosities differ by 30 Pa·s or less.

17. The thin-wall article of claim 1, wherein the polyamide resin has a molecular weight distribution of 2.3 to 2.9.

18. The thin-wall article of claim 1, wherein 0.5 to 5% by mass of the polyamide resin has a molecular weight of 100 to 1,000.

* * * * *